Jan. 3, 1933.  L. G. SIMJIAN  1,893,211
POSE REFLECTING SYSTEM FOR PHOTOGRAPHIC APPARATUS
Filed Oct. 21, 1927  2 Sheets-Sheet 1
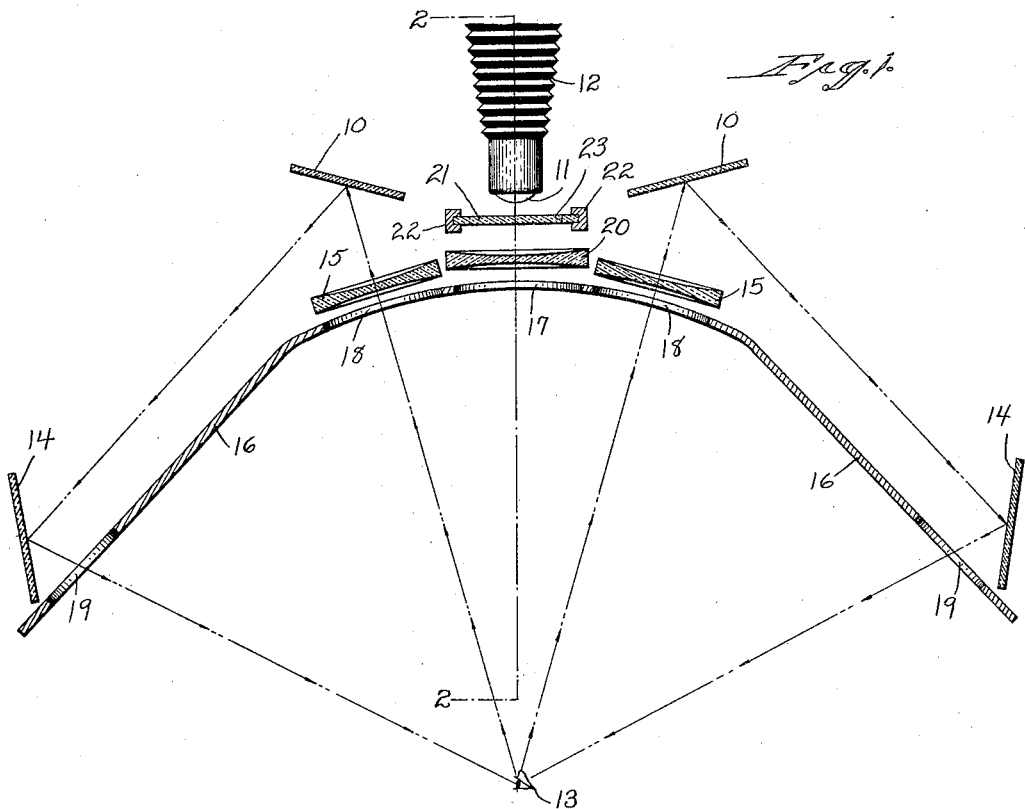
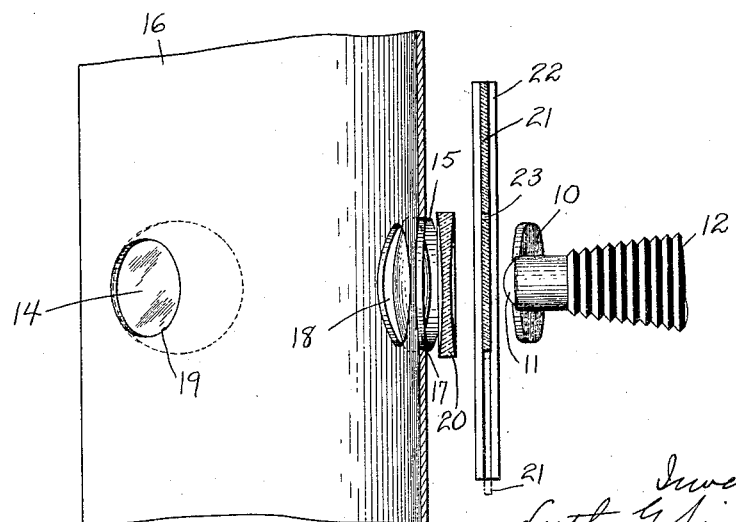

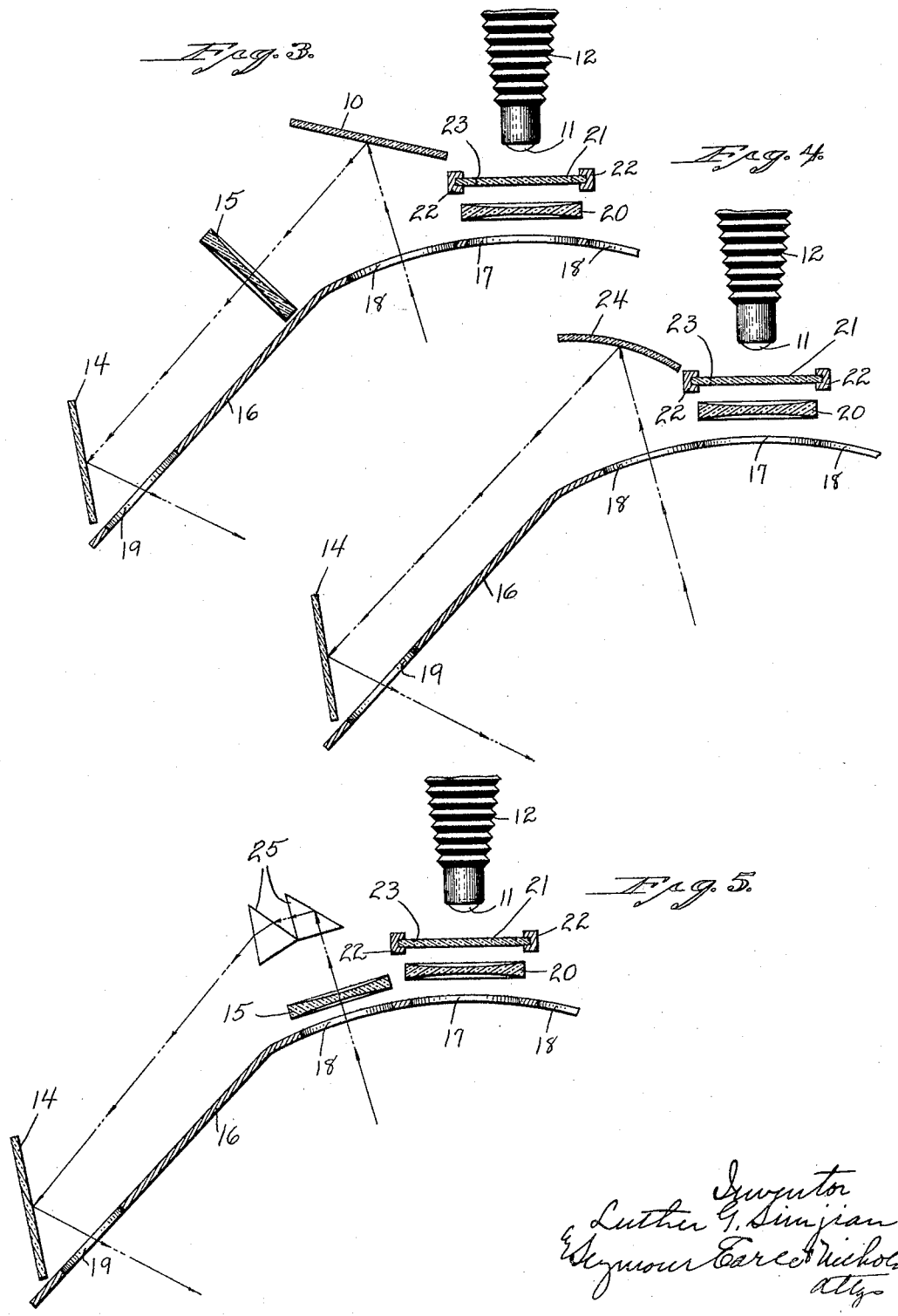

Patented Jan. 3, 1933

1,893,211

UNITED STATES PATENT OFFICE

LUTHER G. SIMJIAN, OF NEW HAVEN, CONNECTICUT

POSE-REFLECTING SYSTEM FOR PHOTOGRAPHIC APPARATUS

Application filed October 21, 1927. Serial No. 227,731.

This invention relates to an improvement in pose-reflecting systems for photographic apparatus, and particularly to pose-reflecting systems designed for use in connection with automatic and semi-automatic photographic machines, though not so limited.

The object of this invention is to provide a pose-reflecting system for photographic apparatus whereby a person being photographed is enabled to observe, before his photograph is taken, the reflection of substantially the identical profile or semi-profile of himself which the camera will record when the same is operated.

My invention further consists in a pose-reflecting system for photographic apparatus characterized as above and having provision for reducing the reflected image to such proportions as to be readily observed or taken in at a glance by the poser.

In the accompanying drawings:

Fig. 1 is a schematic view in horizontal section of one form which my invention may assume;

Fig. 2 is a vertical sectional view on the line 2—2 of Fig. 1;

Fig. 3 is a broken schematic view in horizontal section corresponding generally to Fig. 1, but showing another form which my invention may assume.

Fig. 4 is a similar view showing still another form which a pose-reflecting system constructed in accordance with my invention may assume;

Fig. 5 is a similar view showing a third form which my invention may assume.

In carrying out my invention as herein shown, I employ a pair of corresponding obliquely-disposed image-deflecting mirrors 10 positioned slightly forward of a camera lens 11 and respectively located on opposite sides and closely adjacent to the axis thereof. The said lens 11 forms a feature of, and represents for purposes of description, the lens-system, whatever its character, of a camera 12, which latter may be of any approved type and requires no detailed description.

The parts of my improved pose-reflecting system are duplicated upon the respective opposite sides of the axis of the lens 11 of the camera 12, so that a description of the elements on one side of the said axis will suffice for both.

Each of the obliquely-disposed image-deflecting mirrors 10 is positioned to deflect the image which it receives of the person to be photographed (represented at 13) upon a sight-mirror 14 located forward of its complementary image-deflecting mirror 10 and relatively distant from the axis of the lens 11.

As shown in Figs. 1 and 2, I interpose between the person 13 and each of the image-deflecting mirrors 10 an image-reducing lens 15, commonly known as a "minus" lens, which functions to reduce the image received by the said image-deflecting mirror and hence the image reflected by the sight-mirror to such proportions that it may be readily "taken in" or observed at a glance by the person posing in the said sight-mirror.

In front of the elements of my improved pose-reflecting system proper I locate a substantially semi-circular shield 16, which is formed with a central opening 17 in line with the lens 11 of the camera 12, and on each of the opposite sides of the opening 17 just mentioned with a passage 18 arranged in line with the respective image-reducing lenses 15 and image-deflecting mirrors 10 aforesaid. Near each of its opposite ends the said shield is also formed with a sight-opening 19 located in line with the adjacent sight-mirrors 14 respectively.

Directly back of the central opening 17 in the shield 16 I locate an image-reducing lens 20, and back of the latter, in turn, I locate a movable mirror 21 adapted to move vertically in a pair of guide-channels 22 respectively located on the opposite sides of the said mirror and engaging its opposite edges. About midway of its length the said mirror 21 is formed with a rectangular aperture 23, which is normally out of line with the lens 11 of the camera 12 but movable into registration therewith, as will hereinafter appear.

The shield 16, above described, serves to prevent any image from reaching the mirrors 10 and 21 other than those which they may receive through the openings 17 and 18 respectively, so that the said mirrors are each prevented from reflecting two images, which would be the case in the absence of the shield.

The apertured mirror 21 above referred to forms the subject-matter of a separate application filed October 11, 1927, Serial No. 225,442, and is of itself not claimed herein, but only in combination with the other elements of my present invention, with which it co-operates to enable a person to be photographed to observe, before his photograph is taken, a reflection of either the full-face image or profile-image of himself which the camera 12 will record when operated.

In the use of my improved pose-reflecting system, the person to be photographed positions himself in front of the central image-reducing lens 20 and mirror 21, so that he may see in the said mirror a reflection of himself in full-face or near-full-face. If the sitter prefers a profile or semi-profile view of himself, he may observe the latter in either one of the two oppositely-located sight-mirrors 14. Owing to the intervention of the reducing-lenses 15 and 20 between himself and the mirrors 14 and 21 respectively, the reflection which is seen by the sitter in any one of the said mirrors is reduced in size to such an extent that it may be readily taken in or observed at a glance.

After the sitter has satisfied himself as to the desirability of his pose as he sees it reflected upon a reduced scale in either one of the two sight-mirrors 14 of the central apertured mirror 21, the said mirror 21 is moved rapidly downward from the position in which it is shown in full lines in Fig. 2 to the position in which it is shown by broken lines in the same figure, by any suitable mechanism, or permitted to drop by gravity, if desired.

The downward movement of the mirror 21 as just above described causes the aperture 23 therein to pass by the lens 11 of the camera and so permit the same to record substantially the identical image which the sitter is at the time observing in either of the two sight-mirrors 14 or the central mirror 21 aforesaid.

While my invention is not limited in its broad concept to the feature of reducing the size of the reflected image as above described, this feature is a valuable one and enables the person being photographed to see beforehand at a glance the image which the camera will record when the aperture 23 of the mirror 21 has been brought into registration with the lens 11 of the camera 12. Without some means of reducing the size of the reflected image, the mirrors 14 and 21 must necessarily be of larger size, in order to reflect a substantially full-sized image, from which it follows that the sitter must, under these latter circumstances, sweep a much larger area with his eyes, in order to ascertain the character of his pose. Furthermore, by employing an image-reducing lens or its equivalent in front of the image-deflecting mirrors, the said mirrors need only be of such small size that their centers may be positioned very close to the axis of the lens-system 11, so that the reflected-image observed by the sitter in the sight-mirrors corresponds more closely to the image which the camera will record than would be the case if image-reducing means were to be omitted.

In Fig. 3 of the drawings I have shown another form which my invention may assume and in which the image-reducing lens 15 is interposed between the image-deflecting mirror 10 and the sight-mirror 14.

In Fig. 4 I have shown a form of my invention in which the image observed in the sight-mirror by the person to be photographed is reduced in scale by substituting a concave image-deflecting mirror 24 for the flat image-deflecting mirrors 10 of the forms of my invention shown in the preceding figures. In this form of my invention, the image-reducing lens may be dispensed with, since the mirror 24 functions to both deflect the image of the sitter and reduce it in size.

In Fig. 5 I have shown the form of my invention generally corresponding to that shown in Figs. 1 and 2 but in which the image-deflecting mirror 10 is replaced by a prism-system 25 which receives and deflects onto the sight-mirror 14 the image of the sitter, which, as shown, passes through the image-reducing lens 15 before being deflected by the said prism.

I claim:

1. In a pose-reflecting system for photographic apparatus, the combination with a camera and the lens-system thereof; of an image-deflecting member positioned to one side of and closely adjacent to the axis of the outer end of said lens-system; a sight-mirror positioned forward and to one side of the said image-deflecting member; and an image-reducing lens interposed between the person to be photographed and the said sight-mirror; whereby a person to be photographed is enabled, before his photograph is taken, to observe in the said sight-mirror, a reduced-scale reflection of substantially the identical profile of himself which the said camera will record when the same is operated.

2. In a pose-reflecting system for photographic apparatus, the combination with a camera and the lens-system thereof; of an obliquely-disposed image-deflecting mirror positioned to one side of and closely adjacent to the axis of the outer end of said lens-system; a second or sight-mirror obliquely-disposed with respect to the said image-deflecting mirror and positioned forward of and to one side thereof; and an image-reducing lens interposed between the person to be photographed and the said sight-mirror; whereby a person to be photographed is enabled, before his photograph is taken, to observe in the said sight-mirror a reduced-scale reflection of substantially the identical profile of himself which the said camera will record when the same is operated.

3. In a pose-reflecting system for photographic apparatus, as in claim 2 and having the image-reducing lens interposed directly between the person to be photographed and the image-deflecting mirror.

4. In a pose-reflecting system for photographic apparatus, the combination with a camera and the lens-system thereof; of two obliquely-disposed image-deflecting mirrors respectively positioned upon each of the opposite sides of and closely adjacent to the axis of the outer end of said lens-system; a sight-mirror obliquely-disposed with respect to and positioned forward of and to one side of each of the said image-deflecting mirrors; whereby a person to be photographed is enabled, before his photograph is taken, to observe in either of the said sight-mirrors the reflection of substantially the identical profile of himself which the said camera will record when the same is operated.

5. In a pose-reflecting system for photographic apparatus, the combination with a camera and lens-system thereof; of a mirror-unit normally located in front of said lens-system to prevent the image of a person to be photographed from being recorded by said camera and movable from said normal position to permit the said image to be recorded by said camera; two image-deflecting members respectively positioned on each of the opposite sides of the said mirror-unit and closely adjacent to the axis of the outer end of the said lens-system; and a sight-mirror positioned forward and to one side of each of the said image-deflecting members; whereby a person to be photographed is enabled, before his photograph is taken, to observe a reflection of either the full-face image or right or left profile-image of himself which the camera will record when operated.

6. A pose-reflecting system for photographic apparatus as in claim 5, and having provision for reducing the images reflected from the said sight-mirror and the said mirror-unit to such proportions as to be readily observed at a glance.

7. In a pose-reflecting system for photographic apparatus, the combination with a camera and lens-system thereof; of a mirror-unit normally located in front of said lens-system to prevent the image of a person to be photographed from being recorded by said camera, and movable from said normal position to permit the said image to be recorded by said camera; two image-deflecting members respectively positioned upon each of the opposite sides of the said mirror-unit and closely adjacent to the axis of the said lens-system; and a sight-mirror positioned forward and to one side of each of the said image-deflecting members; whereby a person to be photographed is enabled, before his photograph is taken, to observe a reflection of either the full-face or the right or left profile-image of himself which the camera will record when operated.

8. In a pose-reflecting system for photographic apparatus, the combination with a camera and lens-system thereof; of a mirror-unit normally located in front of said lens-system to prevent the image of a person to be photographed from being recorded by said camera, and movable from said normal position to permit the said image to be recorded by said camera; two image-deflecting members respectively positioned upon each of the opposite sides of the said mirror-unit and closely adjacent to the axis of the said lens-system; a sight-mirror positioned forward and to one side of each of the said image-deflecting members; and an image-reducing lens interposed between the person to be photographed and each of the image-deflecting mirrors and the central mirror-unit; whereby a person to be photographed is enabled, before his photograph is taken, to observe a reduced-scale reflection of either the full-face or the right or left profile-image of himself which the camera will record when operated.

9. In a pose-reflecting system for photographic apparatus, the combination with a camera and the lens-system thereof; of a mirror-unit normally located in front of said lens-system to prevent the image of a person to be photographed from being recorded by said camera and movable from said normal position to permit the said image to be recorded by said camera; two obliquely-disposed image-deflecting mirrors respectively positioned upon each of the respective opposite sides of the said mirror-unit and closely adjacent to the axis of the outer end of the said lens-system; and a sight-mirror positioned forward and to one side of each of the said image-deflecting mirrors; whereby a person to be photographed is enabled, before his photograph is taken, to observe a reflection of either the full-face or the right or left-profile-image of himself which the camera will record when operated.

10. In a pose-reflecting system for photographic apparatus, the combination with a camera and the lens-system thereof; of a mirror-unit normally located in front of said lens-system to prevent the image of a person to be photographed from being recorded by said camera and movable from said normal position to permit the said image to be recorded by said camera; two obliquely-disposed image-deflecting mirrors respectively positioned upon each of the opposite sides of the said mirror-unit and closely adjacent to the axis of the outer end of the said lens-system; a sight-mirror positioned forward and to one side of each of the said image-deflecting mirrors; and an image-reducing lens interposed between the person to be photographed and each of the said image-deflecting mirrors and the said mirror-unit; whereby a person to be photographed is enabled, before his photograph is taken, to observe a reduced-scale reflection of either the full-face or the right or left profile-image of himself which the camera will record when operated.

11. In a pose-reflecting system for photographic apparatus, the combination with a camera and lens-system thereof; of an image-deflecting member positioned to one side of and closely adjacent to the axis of the outer end of the said lens-system and horizontally in line therewith; a sight-mirror positioned forward and to one side of the said image-deflecting mirror; and means for reducing the image reflected from the said sight-mirror to such proportions as to be readily observed at a glance; whereby a person to be photographed is enabled, before his photograph is taken, to observe in the said sight-mirror the reflection of substantially the identical profile of himself which the said camera will record when the same is operated.

12. In a pose-reflecting system for photographic apparatus, the combination with a camera and lens-system thereof; of an obliquely-disposed image-deflecting mirror positioned to one side of and closely adjacent to the axis of the outer end of the said lens-system and horizontally in line therewith; a second or sight-mirror obliquely-disposed with respect to the said image-deflecting mirror and positioned forward of and to one side thereof; and means for reducing the image reflected from the said obliquely-disposed sight-mirror to such proportions as to be readily observed at a glance; whereby a person to be photographed is enabled, before his photograph is taken, to observe in the said sight-mirror the reflection of substantially the identical profile of himself which the said camera will record when the same is operated.

In testimony whereof, I have signed this specification.

LUTHER G. SIMJIAN.